US012319075B2

(12) United States Patent
Goto et al.

(10) Patent No.: US 12,319,075 B2
(45) Date of Patent: Jun. 3, 2025

(54) PRINTING APPARATUS

(71) Applicant: CANON FINETECH NISCA INC., Misato (JP)

(72) Inventors: Shin Goto, Ichikawa (JP); Hiroki Kurosu, Matsudo (JP); Kiyotaka Henmi, Shiroi (JP); Yasutaka Iwasa, Zama (JP)

(73) Assignee: Canon Finetech Nisca Inc., Saitama (JP)

(*) Notice: Subject to any disclaimer, the term of this patent is extended or adjusted under 35 U.S.C. 154(b) by 56 days.

(21) Appl. No.: 17/172,495

(22) Filed: Feb. 10, 2021

(65) Prior Publication Data

US 2021/0252875 A1 Aug. 19, 2021

(30) Foreign Application Priority Data

Feb. 14, 2020 (JP) ................................. 2020-023383
Feb. 8, 2021 (JP) ................................. 2021-018429

(51) Int. Cl.
*B41J 3/407* (2006.01)
*B41J 2/325* (2006.01)

(52) U.S. Cl.
CPC ........... *B41J 3/40733* (2020.08); *B41J 2/325* (2013.01); *B41J 3/40731* (2020.08)

(58) Field of Classification Search
CPC ..... B41J 3/40733; B41J 2/325; B41J 3/40731
See application file for complete search history.

(56) References Cited

U.S. PATENT DOCUMENTS

2006/0291922 A1* 12/2006 Seol .................. G03G 15/2064 399/329

FOREIGN PATENT DOCUMENTS

| | | | | |
|---|---|---|---|---|
| JP | H0559473 U | * 8/1993 | ............. | G03G 15/20 |
| JP | H11309834 A | * 11/1999 | ............. | B41C 1/055 |
| JP | 2003-103844 A | 4/2003 | | |
| JP | 2003291332 A6 | * 10/2003 | ................ | B41J 2/01 |
| JP | 2007111929 A | * 5/2007 | .............. | B41J 3/407 |

* cited by examiner

*Primary Examiner* — Yaovi M Ameh
(74) *Attorney, Agent, or Firm* — Venable LLP

(57) ABSTRACT

A printing apparatus includes a conveyance unit configured to convey a tube-shaped print medium; a print head configured to perform printing on the tube-shaped print medium that is conveyed by the conveyance unit in a conveyance direction; a heater unit arranged on an upstream side relative to the print head in the conveyance direction and configured to include a metal member and a heat generation body for heating on the metal member; and a pressing unit configured to press the tube-shaped print medium toward the metal member.

13 Claims, 13 Drawing Sheets

PRINTING APPARATUS

BACKGROUND OF THE INVENTION

Field of the Invention

The present invention relates to a printing apparatus and, more specifically, to a printing apparatus that performs printing on a tube-shaped print medium.

Description of the Related Art

In this type of printing apparatus, for performing printing on a tube-shaped print medium, the tube-shaped print medium is nipped and crushed by a print head and a platen for performing printing. On the other hand, the tube-shaped print medium may become stiff and less deformable due to a low temperature of the environment in which the printing apparatus operates, etc. If the tube-shaped print medium is not easily deformed, the tube-shaped print medium does not properly abut on the print head that performs printing, which causes a problem that normal printing cannot be performed.

In order to solve such a problem, in Japanese Patent Laid-Open No. 2003-103844, there is described that a heater is arranged in the vicinity of the upstream side of a printing mechanism including a print head and a platen in the conveyance path of a tube-shaped print medium. Specifically, a pipe-shaped heater configured so that a tube-shaped print medium passes therethrough is arranged in the vicinity of the upstream side of the printing mechanism. Accordingly, it is possible to apply heat to the tube-shaped print medium immediately before the tube-shaped print medium is conveyed and supplied to the printing mechanism, so that the temperature of the tube-shaped print medium is prevented from decreasing before the tube-shaped print medium reaches the printing mechanism, and thus the tube-shaped print medium can be easily deformed in the printing mechanism.

However, since the heat application configuration described in Japanese Patent Laid-Open No. 2003-103844 is for applying heat to a tube-shaped print medium passing through the pipe-shaped heater, there is a space (layer of air) between the heater and the tube-shaped print medium, which causes reduction in the efficiency of heat application to the tube-shaped print medium. Therefore, there is a problem that a relatively large amount of electric power is necessary for achieving the required purpose of heat application.

SUMMARY OF THE INVENTION

An object of the present invention is to provide a printing apparatus that includes a tube heating unit and is capable of efficiently applying heat to a tube-shaped print medium.

In an aspect of the present invention, a printing apparatus includes a conveyance unit configured to convey a tube-shaped print medium; a print head configured to perform printing on the tube-shaped print medium that is conveyed by the conveyance unit in a conveyance direction; a heater unit arranged on an upstream side relative to the print head in the conveyance direction and configured to include a metal member and a heat generation body for heating the metal member; and a pressing unit configured to press the tube-shaped print medium toward the metal member.

According to the above-described configuration, it is possible to efficiently apply heat to the tube-shaped print medium in the printing apparatus including a tube heating unit.

Further features of the present invention will become apparent from the following description of exemplary embodiments with reference to the attached drawings.

DESCRIPTION OF THE EMBODIMENTS

Hereinafter, a detailed explanation is given of embodiments of the present invention with reference to the attached drawings.

Figure 1:
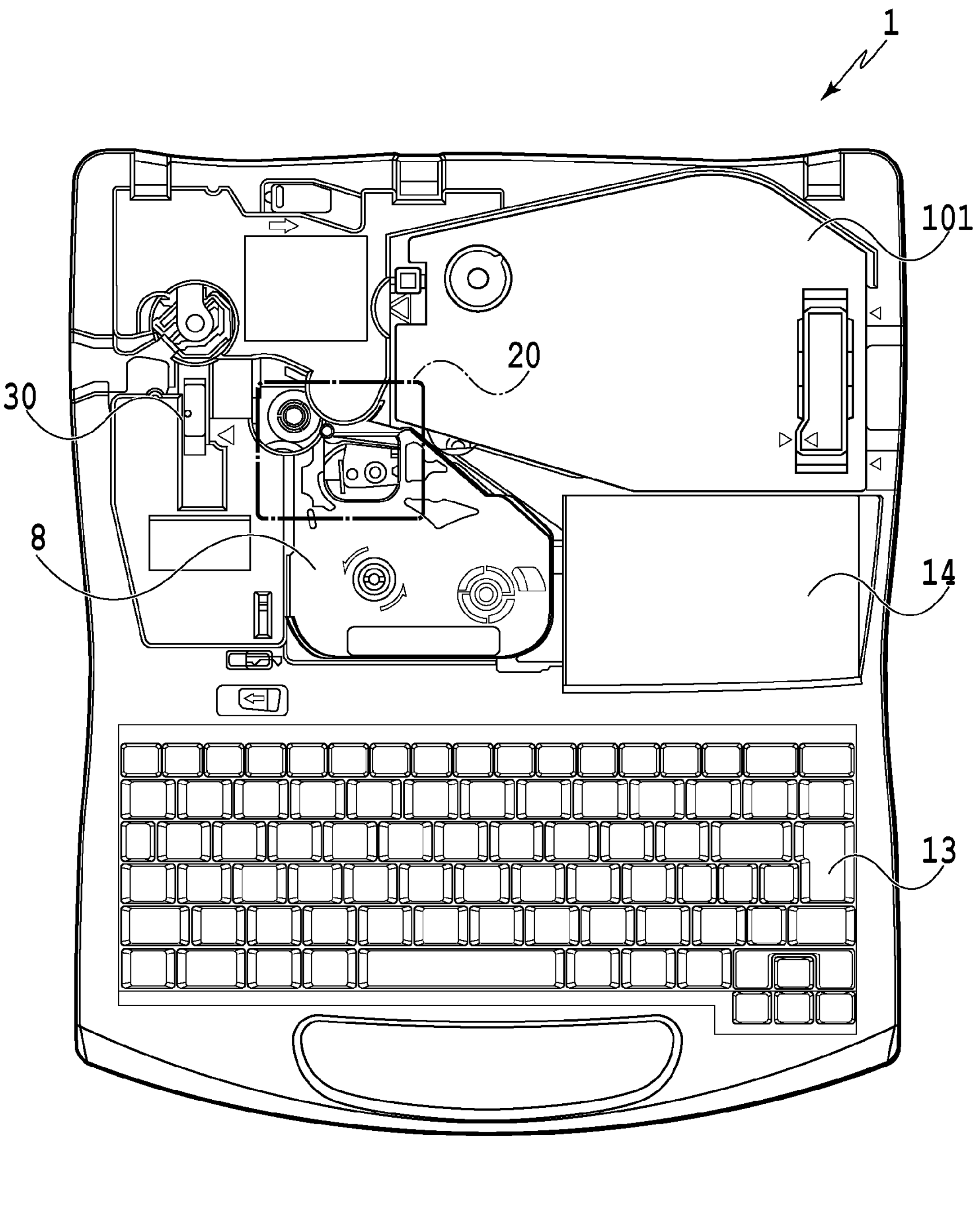
FIG. 1 is a view illustrating an outer appearance of a printer including a tube heating unit according to an embodiment of the present invention.

FIG. 1 is a view illustrating the outer appearance of a printing apparatus (hereinafter also referred to as a printer) including a tube heating unit 101 according to an embodiment of the present invention. The printer 1 of the present embodiment prints on printing mediums including a tube-shaped printing medium (hereinafter, also simply referred to as a tube), and is configured to be portable as with a laptop computer.

When roughly divided, this printer 1 includes an operation part 13 provided with a keyboard, etc., a display part 14 provided with an LCD and a display control part, a conveyance unit for conveying a tube as a printing medium, a printing part 20 that performs printing on the tube, a cutting part 30 that performs a cutting process for the tube on which printing has been performed by the printing part 20, and a tube heating unit for heating the tube. The tube heating unit 101 is internally provided with a heater for heating the tube and a pressing unit that presses the tube. The tube heating unit 101 also serves as a guide unit for the tube to the print part 20.

[Operation Part]

The operation part 13 of FIG. 1 includes a function key, a character/number/symbol key, a space key, a conversion key, a cross direction key, a return key, etc., and an user can operate these keys to input the type, size, print conditions, etc., of the print medium, so as to set the printing information of the printer 1.

[Display Part]

Figure 2:
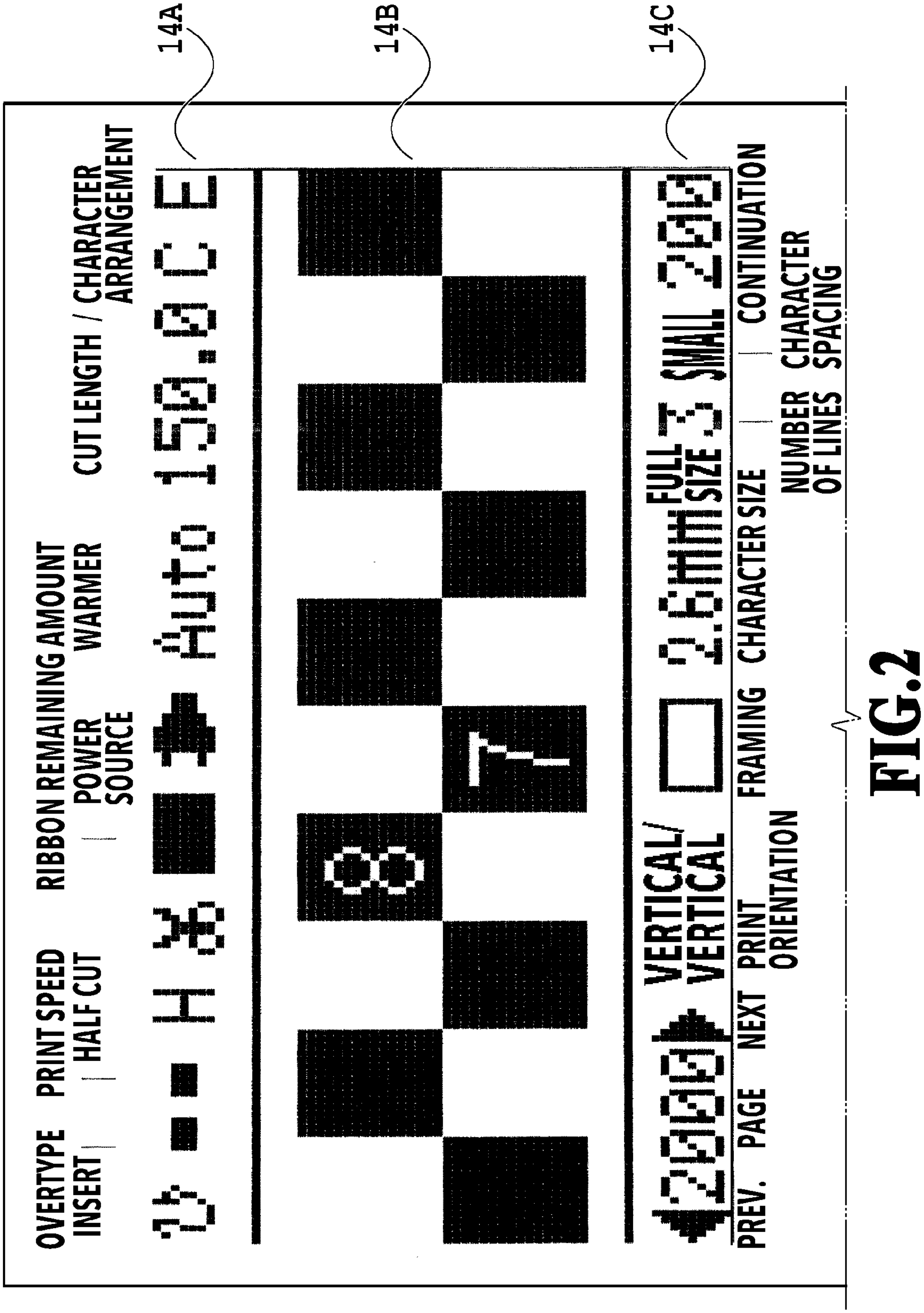
FIG. 2 is a diagram illustrating a display part of the printer according to an embodiment of the present invention.

FIG. 2 is a diagram illustrating displayed contents on the display part 14 of FIG. 1. The LCD of the display part 14 is divided into three display areas: a various kinds of information display area 14A in which an input mode, etc., are displayed; a character information display area 14B in which characters, numbers, and symbols (hereinafter shortened into characters) that are input from the operation part 13 are displayed; and a parameter display area 14C in which a character size, etc., are displayed. Further, the various kinds of information display area 14A and the parameter display area 14C are arranged above and below the character information display area 14B, respectively.

The various kinds of information display area 14A can perform display as follows: an input mode display indicating whether the user inputs alphanumeric characters, romaji, and hiragana via the operation part 13; an insert/overtype mode display (edit mode display) indicating whether the user inputs by inserting or overtyping via the operation part 13; a display of "type of print medium"; a display of "mode command" (cut command of either full-cut or half-cut mode and the number of cuts) indicating how to cut pages in a case where printing of multiple pages is performed in one printing operation; a cut-length/character-arrangement/margin display in which "cut length" indicating the interval at which the tube is cut, "character arrangement" indicating whether the character position is centered or left-aligned, and "margin" indicating a margin from the left end of a tube to the leading character are displayed; a previous page display that is displayed in a case where there is another page before the currently-displayed page; a next page display that is displayed in a case where there is another page after the currently-displayed page; a power source display that indicates that the power source is on, etc.

Further, the parameter display area 14C can perform display as follows: a page display in which page of the print data is currently displayed is numerically displayed; a print orientation display in which the print orientation of any of "landscape/horizontal writing", "portrait/vertical writing", and "portrait/horizontal writing" to be used is displayed; a frame box display in which the shape of a frame box selected in a case of adding a frame to characters is displayed; a character size display in which the selected character size is displayed; a number of lines display in which the number of lines to be printed is displayed; a character spacing display in which the selected character spacing is displayed; a continuous print display in which how many pages are to be printed for the currently-displayed characters is displayed, etc.

In the character information display area 14B, a character string of characters (characters displayed after character data, which is input print data, undergoes a predetermined process) that are input via the operation part 13 is displayed. Note that, in the character information display area 14B, a cursor is displayed at a position corresponding to input intended by the user.

[Cutting Part]

Referring to FIG. 1 again, the cutting part 30 that performs a cutting process on a tube or tape, which is a print medium, is arranged on the downstream side relative to the conveyance roller 4 (see FIG. 3) of the printing part 20 in the conveyance direction. By use of a cutter blade and a cutter receiving member, which are not illustrated in the drawing, the cutting part 30 performs a half-cut or full-cut process to the tube T on which printing has been performed by the printing part 20. The tube T that has been cut is to be discharged by the conveyance unit.

[Printing Part]

Figure 3:
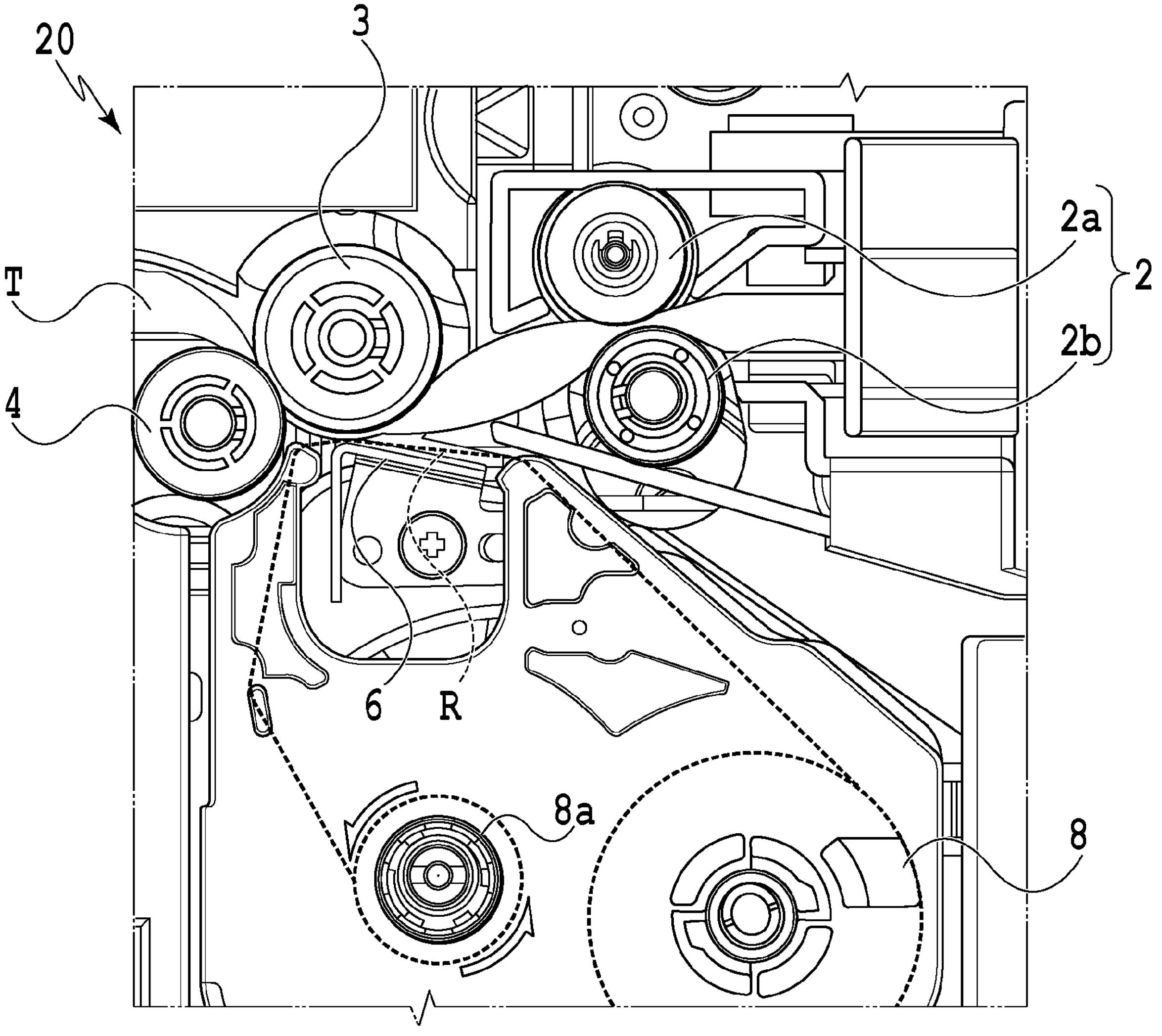
FIG. 3 is a view illustrating a periphery of the printing part of the printer according to an embodiment of the present invention in detail.

FIG. 3 is a view illustrating the configuration of the printing part 20. The printing part 20 includes a supply roller pair 2 that is configured with supply rollers 2$a$ and 2$b$, for conveying the tube T, which is a print medium, and a print head 6 and a platen roller 3 that are arranged on the downstream side relative to the supply roller pair 2 in the conveyance direction of the tube T. Further, a conveyance roller 4 that is arranged on the downstream side relative to the print head 6 and the platen roller 3 is included. The print head 6 is provided so as to face the platen roller 3 via the tube T. Further, the conveyance roller 4 is provided so as to face the platen roller 3 at a position different from the print head 6 in the circumferential direction of the platen roller 3. The print head 6 includes a predetermined number of heat generation elements arranged in the direction orthogonal to the conveyance direction of the tube T, and the heat generation elements are selectively made to generate heat, so that ink on the later-described ink ribbon can be transferred to the tube T.

The ink ribbon cassette 8 stores the ink ribbon R wound in a roll shape, and conveys the ink ribbon R to the printing unit 20. Between the platen roller 3 and the print head 6, the ink ribbon R is conveyed to the print head side of the conveyed tube T. The ink ribbon R is supplied from the ribbon supply reel of the ink ribbon cassette 8 and is wound on the ribbon winding reel of the ink ribbon cassette 8. The printer 1 of the present embodiment can perform printing using the ink ribbon R by mounting the ink ribbon cassette 8 in a replaceable manner.

The conveyance roller 4, the platen roller 3, the supply rollers 2$a$ and 2$b$, and the spool 8$a$ of the ribbon winding reel of the ink ribbon cassette 8 of FIG. 3 are driven by the later-described main motor 5, which is a common drive source. Further, the print head 6 is configured to be movable by the later-described sub motor 9 to the printing position, in which the tube T is nipped between the print head 6 and the platen roller 3 so that printing is performed, and to the retraction position, in which the distance from the print head 6 to the platen roller 3 is wider than that of the printing position.

For performing printing on the tube T, the print head 6 moves to the printing position. The print head 6 presses the tube T via the ink ribbon R of the ink ribbon cassette 8 and selectively makes the heat generation elements of the print head 6 generate heat according to the print data which is input from the operation part 13. Accordingly, the ink of the ink ribbon R is melted and transferred to the tube T so that printing is performed. Further, on the upstream side relative to the supply roller pair 2 and the downstream side relative to the conveyance roller 4, there is arranged a transmission-type integrated sensor (not illustrated in the drawing) for detecting the presence or absence of the tube T so as to detect the leading edge of the tube T that is conveyed.

Note that examples of the material of the tube T used as the print medium in the present embodiment include PVC (polyvinyl chloride). PVC tubes are crushed while passing between the print head 6 and the platen roller 3 in the printing part 20, but, after passing through the printing part 20, the crushed state is restored to the original tubular shape.

[Tube Heating Unit]

Figure 4:
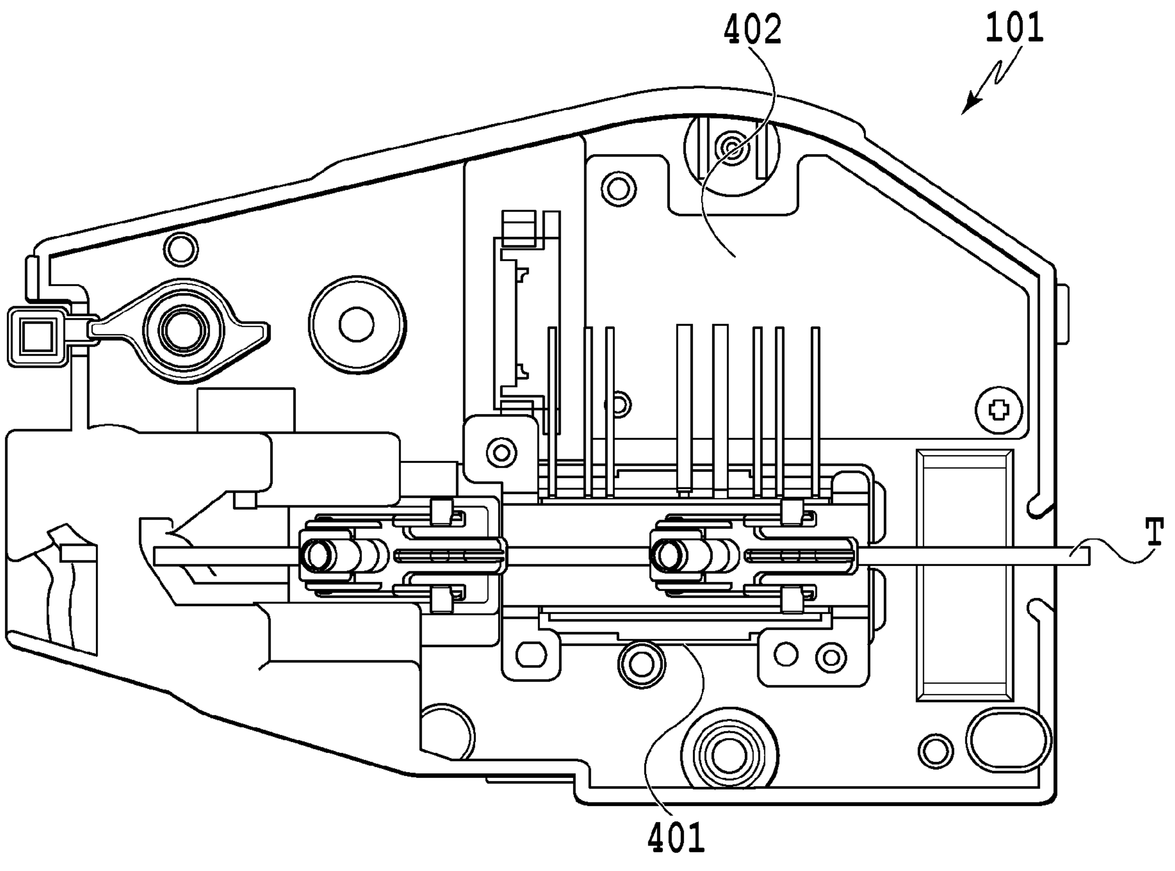
FIG. 4 is a view for explaining the tube heating unit according to an embodiment of the present invention.

In FIG. 1, a heater unit is provided inside the tube heating unit 101, which is positioned on the upstream side relative to the printing part 20 in the conveyance direction of the print medium. FIG. 4 is a view illustrating the inside of the tube heating unit 101. The tube heating unit 101 according to an embodiment of the present invention applies heat to the tube T in a state where the tube T is pressed against a heat generating portion of the heater unit 401, so that the tube T is warmed, and the rigidity of the tube T is reduced. Accordingly, the tube T becomes more deformable, and therefore the tube T and the print head 6 properly abut on each other, so that normal printing can be performed.

The tube T is pressed toward a metal member 502 by the later-described pressing member 504 and is brought into contact with the metal member 502. When the metal member is heated by the heater 501 provided on the metal member 502, the tube T is heated via the contact part with the metal member 502. The tube T is conveyed by the supply roller pair 2 while receiving heat from the heater unit 401. In FIG. 4, a control circuit board 402 that controls the temperature of the later-described heater 501 is arranged above the heater unit 401.

Figure 5A:
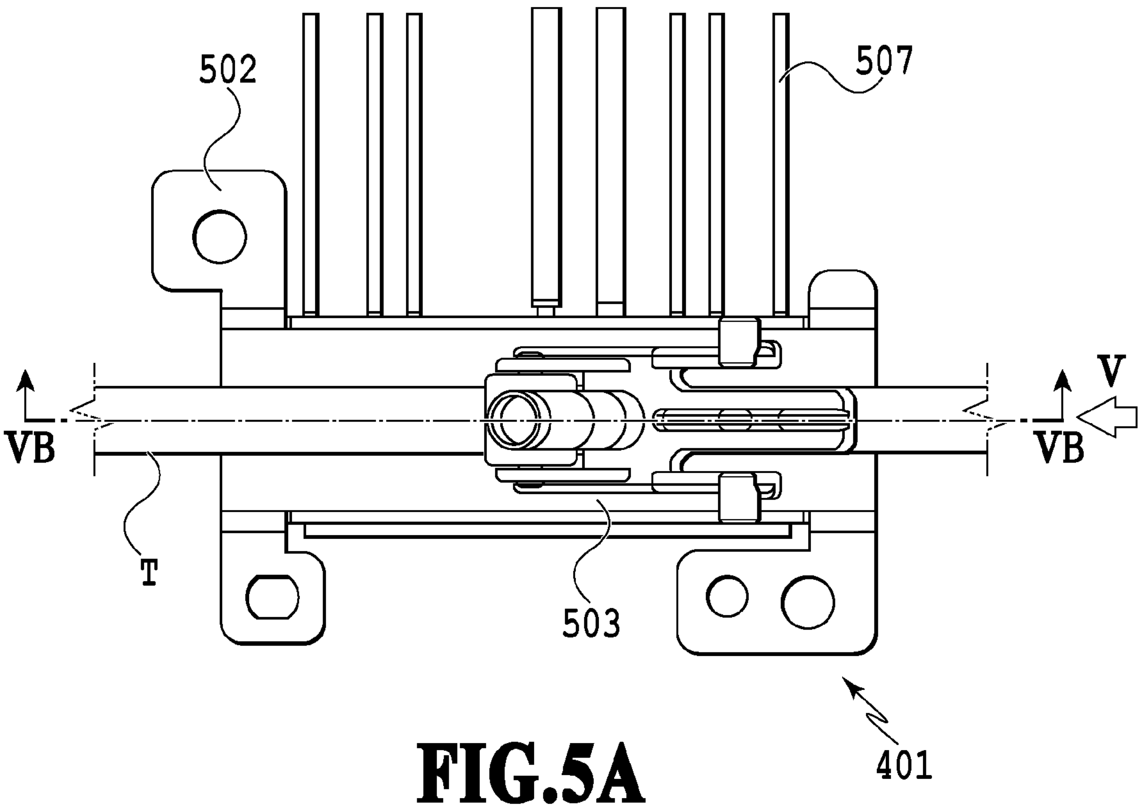
FIG. 5A is a view for explaining a heater configuration of a heater unit in the present invention.
Figure 5B:
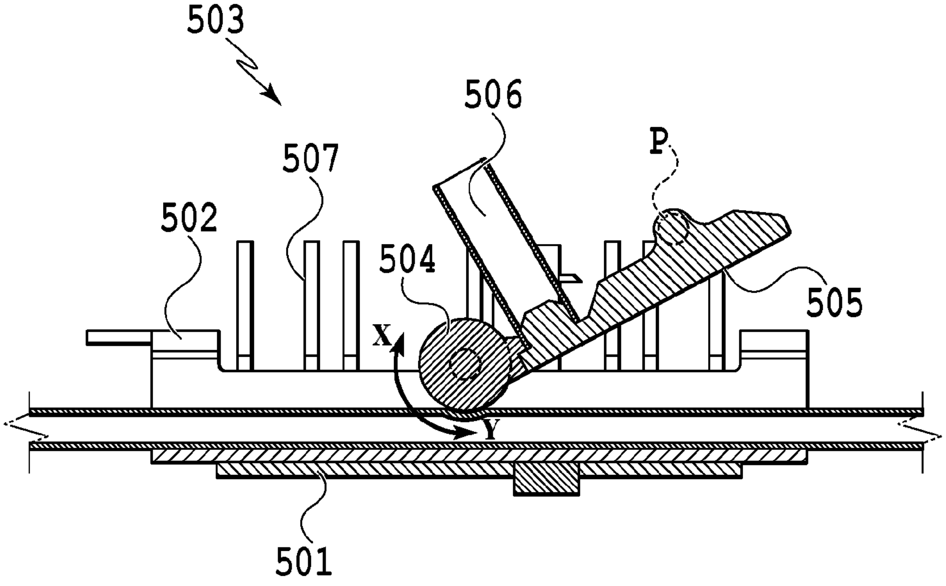
FIG. 5B is a cut-out view cut along the cross section of VB-VB of the heater unit illustrated in FIG. 5A.

With reference to FIG. 5A and FIG. 5B, an explanation will be given of the heater unit 401.

FIG. 5A is a top view illustrating the configuration of the heater unit 401. As illustrated in FIG. 5A, the heater unit 401 is configured with the heater 501, which is a heat generation member (see FIG. 5B), a heater wiring part 507 for supplying electric power to the heater 501, the metal member 502 for transferring heat generated by the heater 501 to the tube T, and a pressing unit 503 that presses the tube T toward the metal member 502 so as to make the tube T abut on the metal member 502. Further, the pressing unit 503 is configured with a holding member 505 that holds a pressing member 504, an elastic member 506, which is a biasing means that biases the holding member 505 toward the metal member, etc.

Note that, in order to efficiently apply heat to the tube T with the heat generated by the heater, it is desirable that the material of the metal member 502 is formed of, for example, a material having high thermal conductivity such as an aluminum material or a copper material.

Further, regarding the shape of the metal member 502, a shape that can have a larger contact area with the tube T is preferable. Therefore, in this embodiment, the metal member 502 has a semi-cylindrical shape made of aluminum. However, the shape of the metal member 502 is not limited to a semi-cylinder, and may be a curved surface having a predetermined curvature.

FIG. 5B is a cross-sectional arrow view taken along VB-VB of FIG. 5A. As illustrated in FIG. 5B, the heater 501 is provided at the bottom portion of the metal member 502, and the heater 501 is connected to the control circuit board 402 via the heater wiring part 507. The holding member 505 that holds the pressing member 504 is installed in the heater unit 401 so as to be rotatable about the rotation shaft P. The holding member 505 rotates about the rotation shaft P, so that it is possible for the pressing member 504 to move together with the holding member 505 in the rotation directions indicated by the arrow X and the arrow Y. The holding member 505 is biased by the elastic member 506 in such a direction that the pressing member 504 approaches the metal member 502. As the elastic member 506, it is possible to use an elastically deformable object such as rubber, other than a spring. Further, in a case where the pressing direction of the pressing member 504 is vertically downward, the biasing can be performed by the weight of the pressing member 504. With such a configuration, the tube T conveyed inside the heater unit 401 can be pressed by the pressing member 504 so as to abut on the metal member 502. Further, the pressing member 504 may be integrally formed with the holding member 505. Besides, by configuring the pressing member 504 with a material having good slidability, it is possible to reduce the resistance when the tube T is conveyed. Then, by making the pressing member 504 a rotatable roller, the resistance when the tube T is conveyed can be further reduced.

Note that, although the heater 501 is provided along almost the entire metal member 502 in the present example, the position of the heater 501 is not limited as such.

Figure 6A:
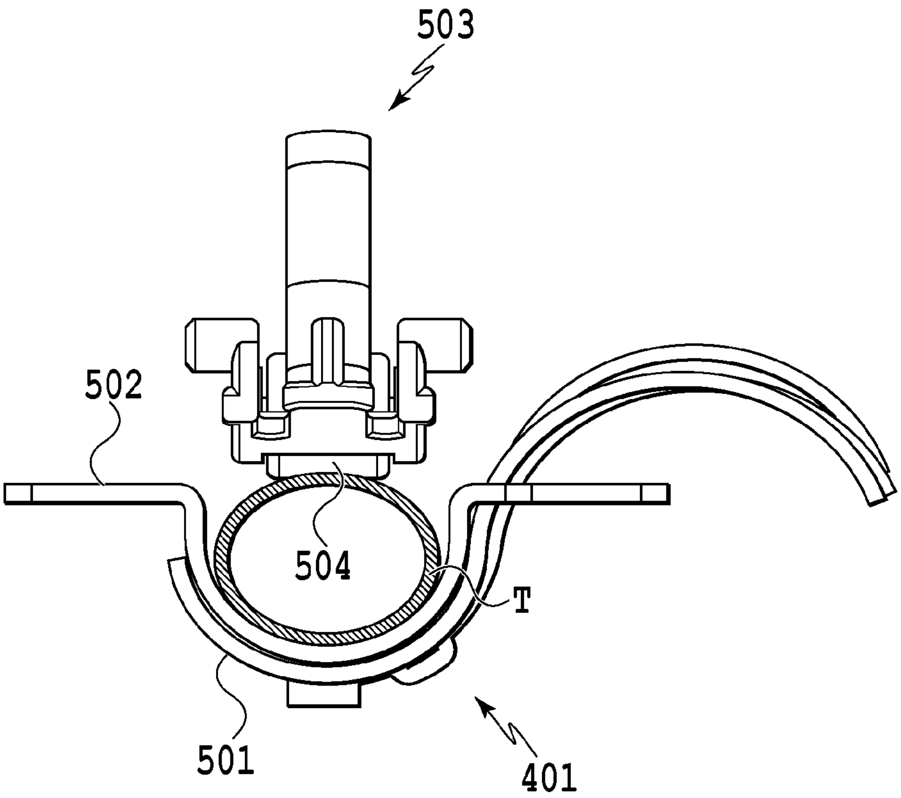
FIG. 6A is a view from the arrow V direction in a state where a large diameter tube passes through the heater unit illustrated in FIG. 5A.
Figure 6B:
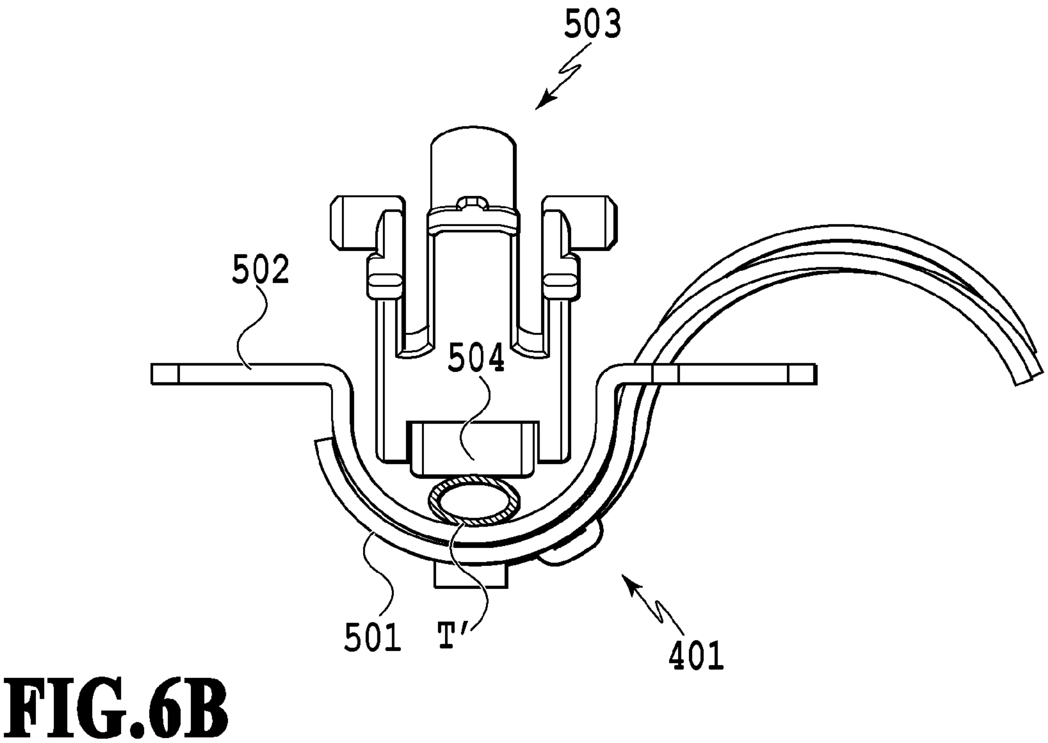
FIG. 6B is a view from the arrow V direction in a state where a small diameter tube passes through the heater unit illustrated in FIG. 5A.

With reference to FIG. 6A and FIG. 6B, an explanation will be given of the state in which heat is being applied to the tube T by the heater unit 401. FIG. 6A and FIG. 6B are arrows views from the direction of the arrow V in FIG. 5A.

As illustrated in FIG. 6A, the pressing member 504 provided in the pressing unit 503 is biased toward the metal member 502 by the elastic member 506 using a spring. The tube T is pressed toward a metal member 502 by the pressing member 504 and is brought into contact with the metal member 502. When the metal member 502 is heated by the heater 501 provided on the metal member 502, the tube T is heated via the contact part with the metal member 502.

As described above, the tube T is conveyed by the supply roller pair 2 of FIG. 3 while heat is being applied by the tube heating unit 101. It is possible that the tube heating unit 101 efficiently applies heat to the tube T since heat is applied to the tube T when the tube T comes into direct contact with the metal member 502, which conducts heat from the heater 501.

In FIGS. 5A and 5B, the region of the tube T in contact with the metal member 502 is a region of the printing part 20 of FIG. 3 that bends when the tube is crushed. In other words, the direction in which the pressing member 504 presses the tube T is a direction substantially orthogonal to the direction in which the print head 6 moves from the retraction position to the printing position and comes into contact with the tube T.

By configuring the printing part 20 and the tube heating unit 101 of the printer 1 in this way, it is possible to efficiently heat and soften the area of the tube R that is bent in the printing part 20 Therefore, even in a low-temperature environment, the tube T and the print head 6 can be correctly brought into contact with each other to perform normal printing.

FIG. 6B is a view illustrating a state in which heat is being applied to a tube T', which has a diameter smaller than that of the tube T of FIG. 6A, by the heater unit 401. In FIG. 6B, the tube T' is pressed toward a metal member 502 by the pressing member 504, which is biased by the elastic member 506, and is brought into contact with the metal member 502 as well. Then, when the metal member 502 is heated by the heater 501 provided on the metal member 502, the tube T' is heated via the contact portion with the metal member 502.

In this way, by pressing the tube T' by the pressing member 504, the tube T' can be brought into contact with the metal member 502 even when the diameter of the tube T' is small. Then, the tube heating unit 101 can efficiently heat the tube T'.

Even though the heater 501 is installed at a location other than the location illustrated in FIG. 5A and FIG. 5B, the heater 501 can apply heat to the tube T via the metal member 502 as long as the heater 501 is at such a location that the heater 501 is in contact with the metal member 502 so that heat is transferred to the metal member 502.

Figure 7A:
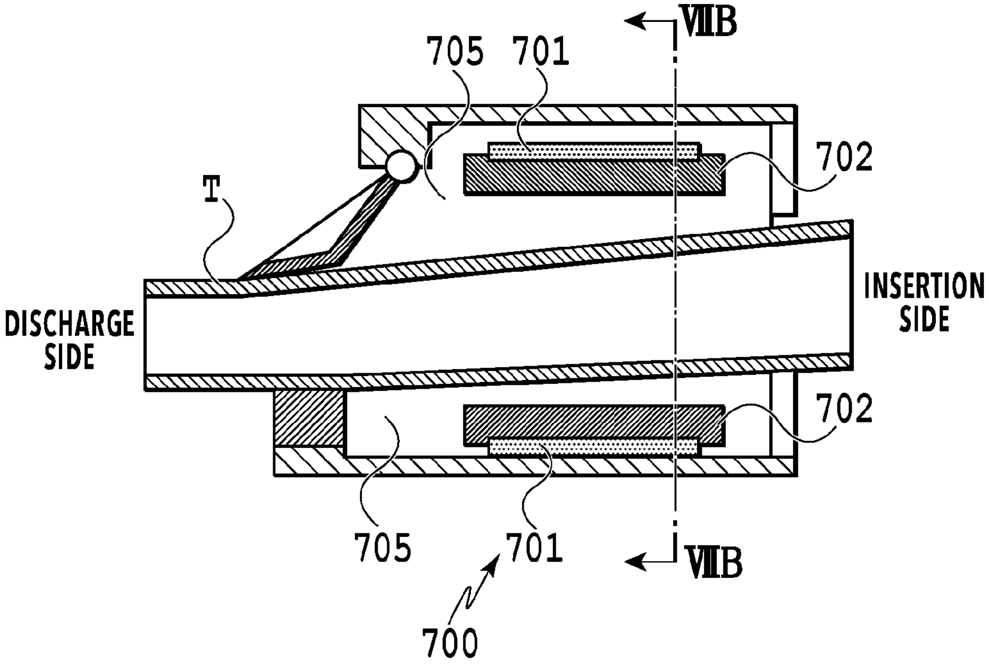
FIG. 7A is a view for explaining a heater unit and a heater configuration in a conventional tube heating unit as a comparative example.
Figure 7B:
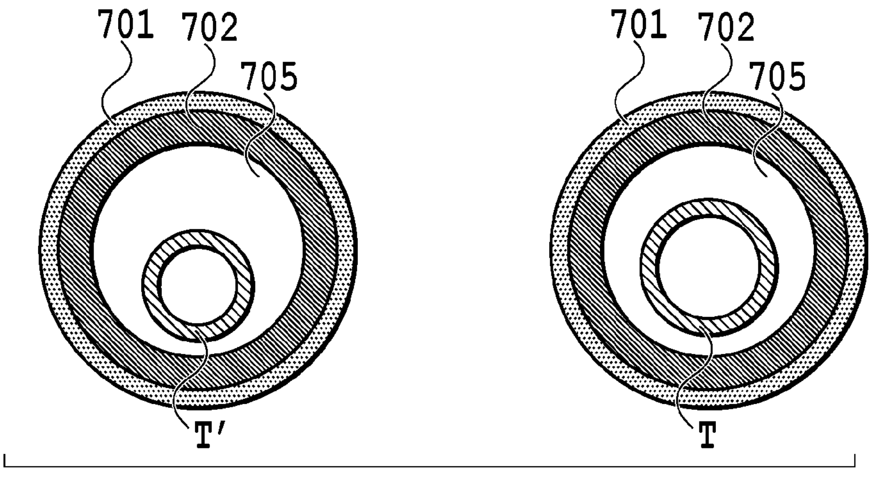
FIG. 7B is a cut-out view cut along the cross section of VIIB-VIIB of the conventional heater unit illustrated in FIG. 7A.

FIG. 7A and FIG. 7B are views for explaining a conventional heat application configuration as a comparative example. As illustrated in these drawings, the conventional heater unit 700 is configured with a heater 701 attached to the outer surface of a metal pipe 702. When the tube T is heated by the heater unit 700, the air layer 705 is interposed between the pipe 702 and the tube T, and the tube T is heated via the air layer 705 that is heated by the heater 701. Generally, the thermal conductivity of air is about 0.024 [W/m·K] and is an extremely low value as compared to the thermal conductivity of the aluminum material used for the metal member 502 in an embodiment of the present invention, which is about 236 [W/m·K].

This indicates that, in a case where heat is transferred to the tube T, if comparing the case where heat is directly transferred from the metal member 502 to the tube T and the case where an air layer exists between the metal member 502 and the tube T, the latter requires a larger amount of energy to apply heat to the tube T than the former.

Further, as illustrated in FIG. 7B, if the diameter of the tube T is different, the thickness of the air layer that exists between the tube T and the pipe 702 is different as well. In a case where the heater unit 700 applies heat to the tube T', which has a small diameter, the air layer 705 that exists between the pipe 702 and the tube T' is thick, and therefore the efficiency of heat application to the tube T' with the heater unit 700 deteriorates. In a case where the efficiency of heat application to the tube deteriorates, the electric power required to sufficiently apply heat to the tube T increases.

As described above, in the conventional heating configuration, the tube T could not be heated efficiently.

[Control Configuration]

Figure 8:
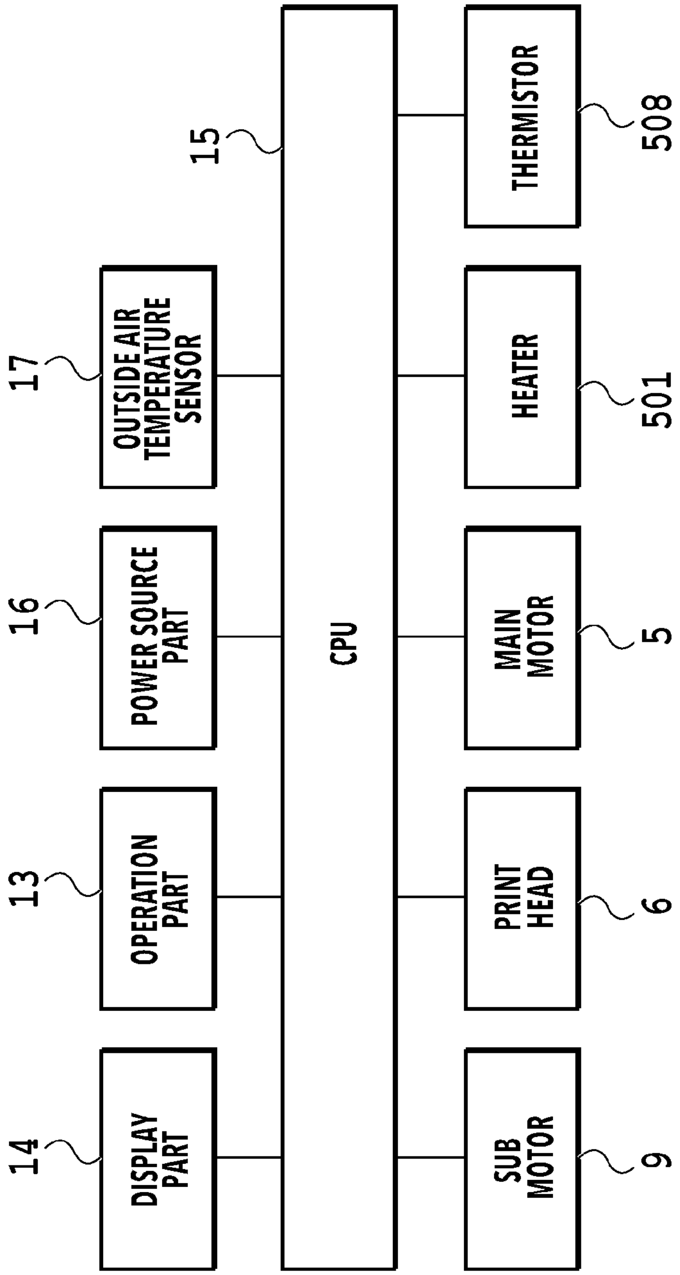
FIG. 8 is a block diagram illustrating a configuration for controlling the printer according to an embodiment of the present invention.

FIG. 8 is a block diagram illustrating a control configuration in the printer 1 according to an embodiment of the present invention. The power source part 16 is a unit provided in the printer 1, so as to supply electric power required for operation of the operation part 13, the display part 14, the print head 6, the main motor 5, the sub motor 9, the heater 501, an outside air temperature sensor 17, a CPU 15, which is a control part, etc.

The CPU 15 controls the operation and processing of each unit in the printer 1, such as heating control by the tube heating unit 101, control of printing operation by the printing part 20, and control of display on the display part 14.

By a user via the keyboard, the operation part 13 inputs various settings to the printer 1, such as the contents to be printed on the print medium, the number of print jobs, and the cutting pattern with the cutting means. Further, the power ON/OFF input to the power source part 16 is also performed from the power source key of the operation part 13. Moreover, selection of the later-described automatic mode or manual mode is also performed by an input from the operation part 13.

The outside air temperature sensor 17 is a sensor that detects the temperature of the environment in which the printer 1 is installed, and the outside air temperature sensor 17 is provided at a position inside the printer 1 that is not affected by the heat of the heater 501.

The CPU 15 controls the tube heating unit 101 based on the temperature detected by the outside air temperature sensor 17. As the control of the tube heating unit 101 in the printer 1 of the present example, the target temperature ranges of three stages, i.e., the high temperature, medium temperature, and low temperature, are set. The target temperature ranges are set with the upper limit temperatures and the lower limit temperatures, and, in the present example, for example, the target temperature range in the low temperature setting is set as 25° C. to 27° C., the target temperature range in the medium temperature setting is set as 35° C. to 37° C., and the target temperature range in the high temperature setting is set as 43° C. to 45° C.

A thermistor 508 for detecting temperature is attached to the metal member 502, so that the temperature of the metal member 502 can be monitored at predetermined sampling intervals. The heater 501 is continuously energized until the temperature of the metal member 502 detected by the thermistor 508 exceeds a predetermined upper limit temperature, and, in a case where the upper limit temperature is exceeded, the heater 501 is de-energized. Further, in a case where the temperature of the metal member 502 detected by the thermistor 508 falls below a predetermined lower limit temperature, energization of the heater 501 is restarted. These controls are repeated, so as to keep the temperature of the metal member 502 within a predetermined range.

Note that, although the thermistor 508 is provided on the metal member 502 in the configuration of the present example, it is also possible that the thermistor 508 is provided on the heater 501 in order to monitor and control the temperature of the heater 501.

The sub motor 9 is for driving the cutting part 30 that cuts the tube T, and a stepping motor is adopted in an embodiment of the present invention. The cutting operation of the tube T is performed by driving the sub motor 9 in the forward and reverse directions. Further, the cutting depth of the cutting means can be adjusted by adjusting the number of pulses for driving the sub motor 9.

The print head 6 is provided in the printing part 20. As described in the explanation of the printing part 20, the tube T and the ink ribbon R are nipped by the print head 6 and the platen roller 3. Then, printing is performed by controlling the heat generation of the heat generation elements of the print head 6.

The drive pulse for driving the heat generation elements of the print head 6 can be changed in multiple stages based on the temperature detected by the outside air temperature sensor 17. In a case where the temperature detected by the outside air temperature sensor 17 is low, the temperature of the tube T is low, so it is necessary to increase the amount of heat applied to the ink ribbon R. At that time, by lengthening the drive pulse (energization time) for the heat generation elements of the print head 6, it is possible to perform proper printing even in a low temperature environment.

The main motor 5 is for driving the platen roller 3, the supply roller 2*a*, etc., and a stepping motor is adopted in an embodiment of the present invention. The forward-feeding and backward-feeding of the tube T are switched by the forward rotation and reverse rotation of the stepping motor. Further, the conveyance speed setting of the printer 1 can be changed in three stages from high speed to low speed according to the control of driving the main motor 5. The driving of the main motor 5 is also connected to the winding spool of the ink ribbon cassette 8, so that collection of the ink ribbon R with which printing on the tube T has been completed is also performed by driving the main motor 5.

[Control Flowchart (Manual Mode)]

Figure 9A:
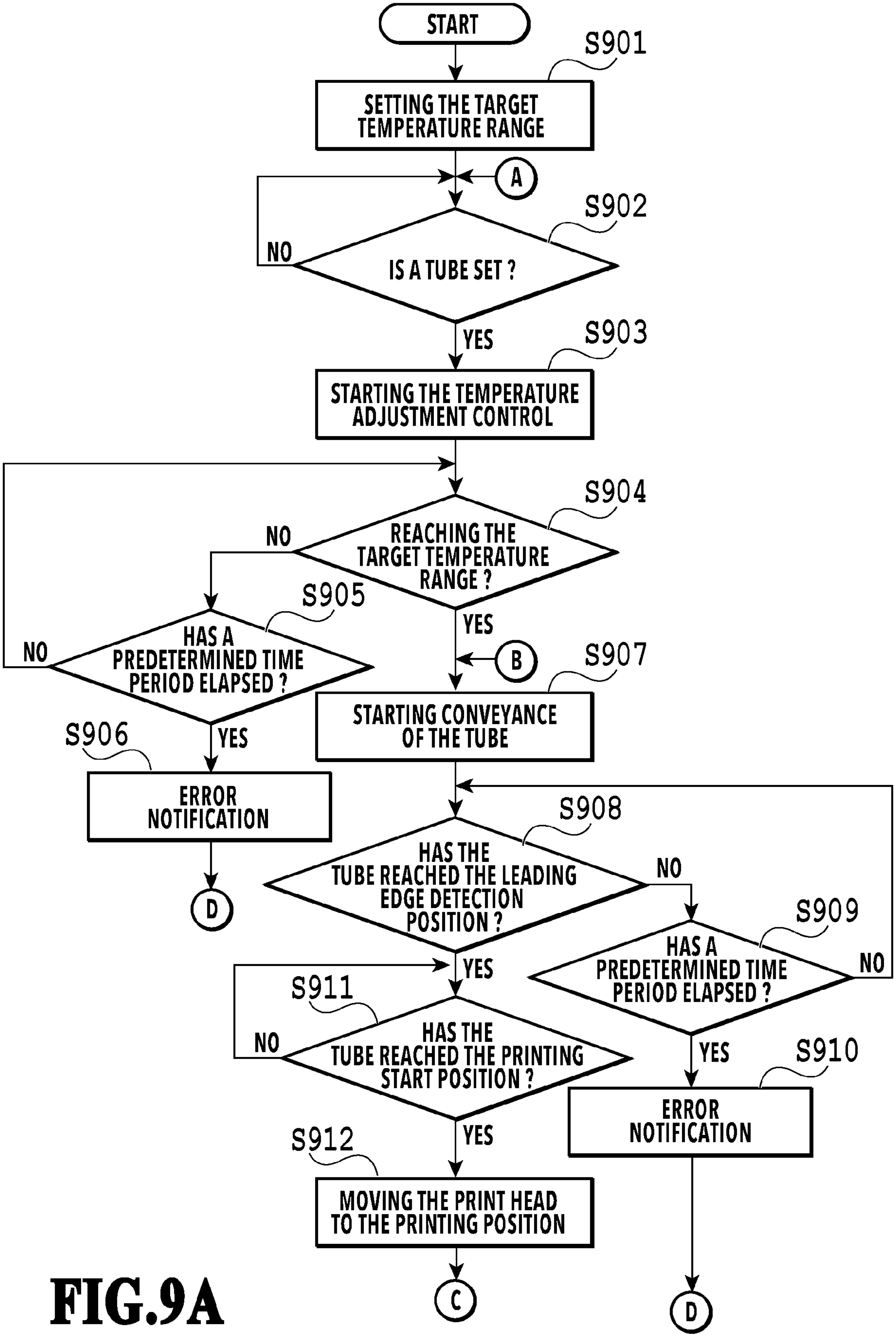
FIG. 9A and FIG. 9B are flowcharts illustrating a control flow of the tube heating unit according to an embodiment of the present invention in a manual mode.
Figure 9B:
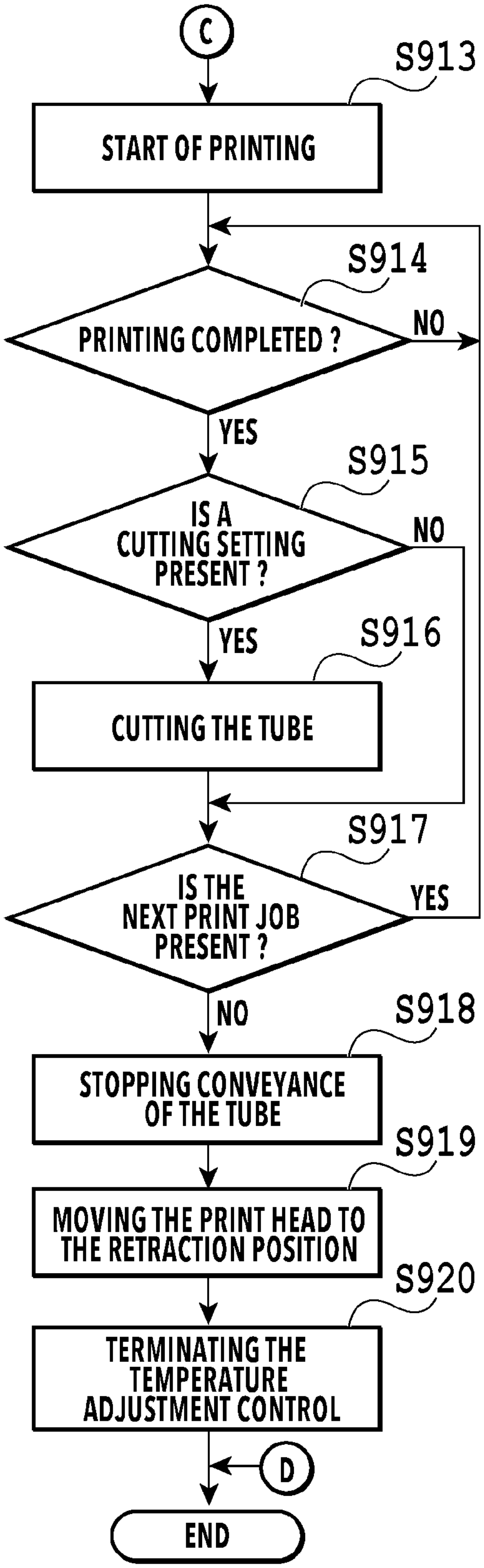

FIG. 9A and FIG. 9B are flowcharts illustrating the operation up to the end of printing in a case where the control of the tube heating unit in the printer 1 according to an embodiment of the present invention is set as the manual mode.

The user presses the power button on the operation part 13, and the printer 1 is energized and starts from a standby state. After turning on the power source of the printer 1, the user inputs and determines the printing contents to be printed on the tube T, the number of pages to be printed, the character size, etc., and the like with the keyboard of the operation part 13. At this time, the user also selects the manual mode or automatic mode of the heater unit 401 at the same time. And the state in which the manual mode is selected is S901.

Further, in Step S901, in a case where the heater unit 401 is operated in the manual mode, the above-described mode setting of three stages is also performed. In an embodiment of the present invention, the three stages are the low temperature mode (25° C. to 27° C.), the medium temperature mode (35° C. to 37° C.), and the high temperature mode (43° C. to 45° C.). The user selects and sets one mode from there.

S902 is a state in which the user inserts a print medium such as a tube T to be printed into the main body and the CPU 15 of the printer 1 determines whether or not the tube is set. In Step S902, if a print medium such as a tube T is inserted and set to the printer 1, the processing proceeds to Step S903, and, if a tube T is not inserted and set, Step S902 is repeated until a tube T is set.

Then, after the user sets the temperature setting of the heater unit 401, the user performs indication of the starting temperature control from the operation part, and the CPU 15 starts energizing the heater 501 via the control board 402, and S903 shows the state in which the temperature control starts.

S904 is a state in which the CPU 15 determines whether or not the thermistor 506 has detected that the temperature of the heater unit 501 has reached the target temperature set by the user by setting the temperature. At this time, in an embodiment of the present invention, a heating time of about one minute is required under the conditions that the outside air temperature is 5° C. and the temperature of the heater unit 401 is set to the high temperature mode (43° C. to 45° C.).

Therefore, S905 is a state in which the CPU 15 determines whether or not the heating time by the heater 501 has elapsed.

According to the flow, since it is assumed that there is some kind of malfunction or abnormality in the printer 1 in a case where the predetermined time period or more has elapsed as the heating time with the heater 501 under the conditions in Step S905, the CPU 15 displays an error on the LCD screen of the display part as an announcement for the user. The state in which this error is being displayed corresponds to S906.

If it is detected that the temperature of the heater 501 has reached the temperature that is set by the user within the predetermined time period, the CPU 15 starts conveying the print medium such as the tube T. This state corresponds to S907. At the point in time of S907, the CPU 15 does not perform the printing operation, but conveys the tube T to the transmission-type integrated sensor that is arranged on the downstream side relative to the above-described conveyance roller 4.

S908 is a state in which the CPU 15 determines whether or not the sensor has detected the leading edge of the tube T. Then, the CPU 15 confirms that the state of "print medium: absent" has changed to the state of "print medium: present" with the arrival of the tube T by the detection of the transmission-type integrated sensor.

At this time, S909 is a state in which the CPU 15 determines whether or not a predetermined time period or more has elapsed to convey the tube T from the set position of the print medium to the transmission-type integrated sensor.

In Step S909, in a case where it cannot be detected by the transmission-type integrated sensor that the tube T has reached the transmission-type integrated sensor, the CPU 15 displays an error on the LCD screen of the display part as an announcement for the user. This state corresponds to S910. This is because, in a case where the reaching cannot be detected by the transmission-type integrated sensor even though the tube T has been conveyed by a predetermined time from the set position, there is a high possibility that a problem such as clogged the tube T has been occurring in the middle of the conveyance path. Therefore, the CPU 15 prompts the user for check with the error displayed in S910.

In a case where the detection of the tube T by the transmission-type integrated sensor is performed without any problems, the CPU 15 determines whether or not the tube T has been fed back to the printing start position. This state corresponds to S911.

In Step S911, if the tube T has reached the printing start position, the processing proceeds to Step S912. If the tube T has not reached the printing start position, Step S911 is repeated until the tube T reaches the printing start position.

Thereafter, the CPU 15 controls the sub motor to move the position of print head 6 to print position where the print head 6 is pressed against the tube T. The state in which the tube T and the ink ribbon R are nipped by the platen roller 3 and the print head 6 is S912.

Thereafter, the CPU 15 starts printing on the tube T based on the information of the printing contents, printing/conveyance settings, etc., which have been input via the above-described operation part 13. This operation corresponds to S913.

S914 corresponds to a state in which the CPU 15 determines whether all of the print setting contents that have been input via the operation part 13 have been completed. If the printing set number of pages by the user has not been completed, the CPU 15 repeats the printing until it is completed.

Upon completion of all of the set number of pages to be printed, the CPU 15 conveys the lastly printed tube T to the above-described cutting part 30 described in FIG. 1, and determines whether or not a cut setting has been made. This state corresponds to S915. In Step S915, if the cut setting is present, the CPU 15 cuts the tube T at the cutting part 30 (S916), and, if the cut setting is not present, the processing proceeds to Step 917.

Thereafter, the CPU 15 determines whether a job to be printed remains. This state corresponds to S917. If a print job remains, the processing returns to the state of S913, so that the CPU 15 restarts printing of the remaining print job.

When all the print jobs are completed, the CPU 15 stops the conveyance of the tube T (S918), and moves the print head 6 from the printing position to the retraction position (S919). Then, if the user indicates the stop of the operation of the heater unit 401 via the operation part 13, the CPU 15 stops the energization to the heater 501 via the control board 402 (S920).

In the case of the manual mode in the printer according to an embodiment of the present invention, the CPU 15 operates/stops the heater unit 401 depending on a command from the user. Finally, the flow ends in a state of standing by so that the CPU 15 can start the next printing.

[Control Flowchart (Automatic Mode)]

Figure 10:
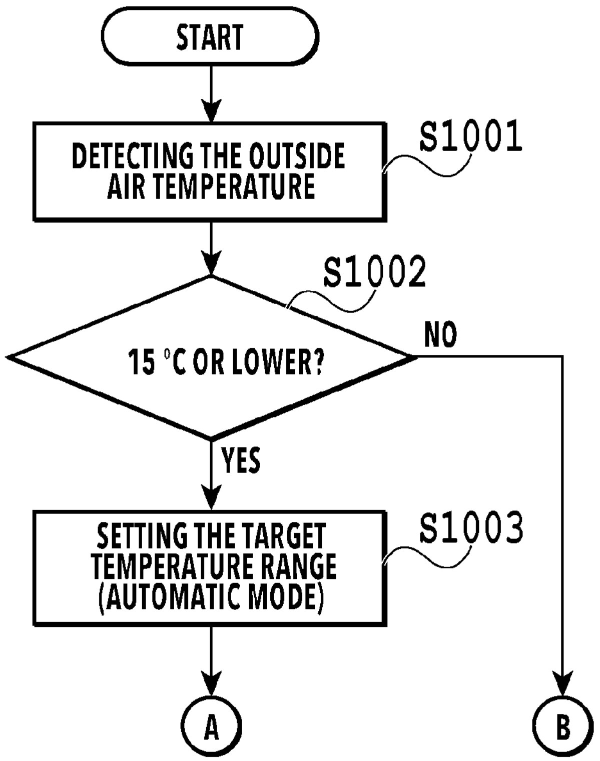
FIG. 10 is a flowchart illustrating a control flow of the tube heating unit according to an embodiment of the present invention in an automatic mode.

FIG. 10 is a flowchart in which the tube T, which is the print medium, is inserted into the printer 1 according to an embodiment of the present invention and the control of the tube heating unit is set as the automatic mode.

The flow starts from a state in which the user inserts the tube T for printing into the printer 1, presses the power source button on the operation part 13, energizes the main body, and stands by. The user turn on of the power source of the printer 1, the printing contents to be printed on the tube T, the number of pages to be printed, the character size, the conveyance speed, etc., are input and determined via the keyboard of the operation part 13. At this time, the user also selects the selection of the manual mode or automatic mode of the heater unit 401 at the same time. In the case the user selected the automatic mode, a state in which the CPU 15 is detecting the outside air temperature is being performed corresponds to S1001. Then, it is a state of S1002 that the CPU 15 determines whether or not the outside air temperature is 15° C. or lower by the outside air temperature sensor 17. If the outside air temperature exceeds 15° C., the processing proceeds to Step S907 of FIG. 9A, so that the CPU 15 performs conveyance, printing, etc., for the tube. On the other hand, if the outside air temperature is 15° C. or lower, the processing proceeds to Step S1003. In Step S1003, since the operation is performed in the automatic mode, the operation will be performed in the standard mode (35° C. to 37° C.) in an embodiment of the present invention. Then, the processing proceeds to Step S902 of FIG. 9A, so that the CPU 15 performs conveyance, printing, etc., for tube. Subsequent control is the same as in the manual mode, so the explanation is omitted.

In the automatic mode, the CPU 15 starts temperature control by the heater unit 401 based on the detection that the tube T has been inserted and set, and the CPU 15 stops the temperature control by the heater unit 401 based on the elapsed of a predetermined time after the end of the printing job.

Further, the tube heating unit 101 can be detachable from the printer 1, and when printing in a cold environment, the tube heating unit 101 can be attached to the printer 1.

Example 2

(Stopper Configuration)

Figure 11A:
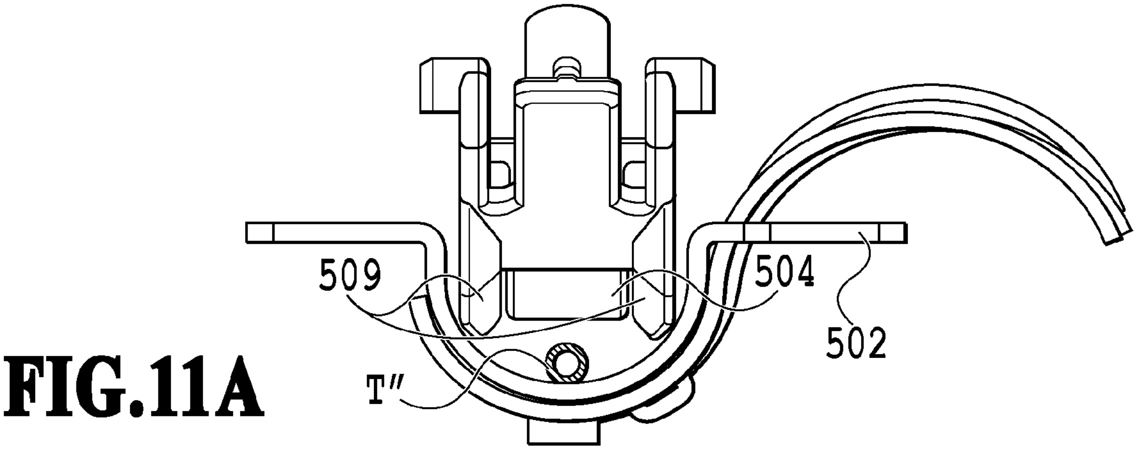
FIG. 11A through FIG. 11C are views illustrating a configuration for defining a range in which a pressing unit presses a tube in the printer according to an embodiment of the present invention.
Figure 11B:
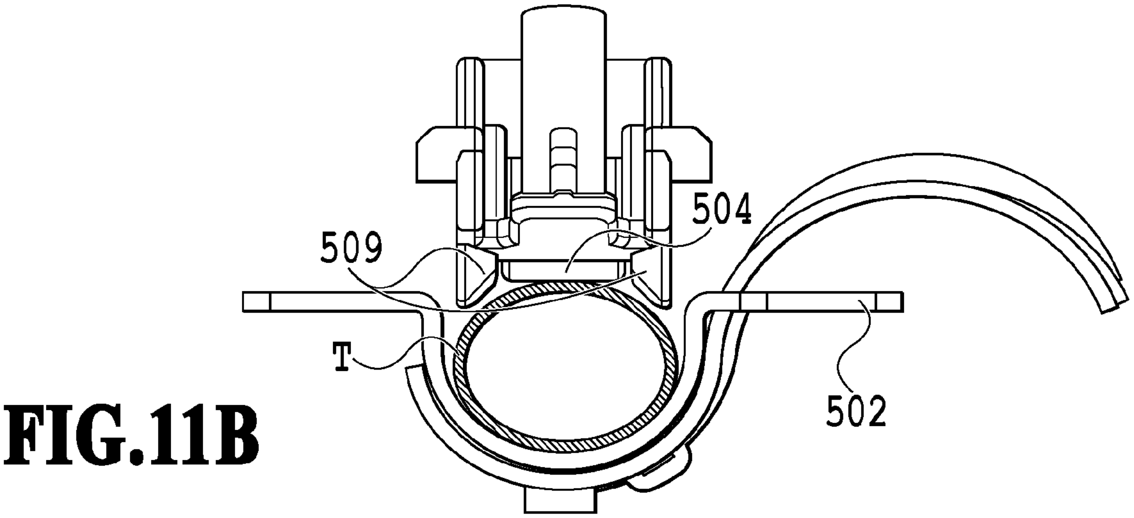
Figure 11C:
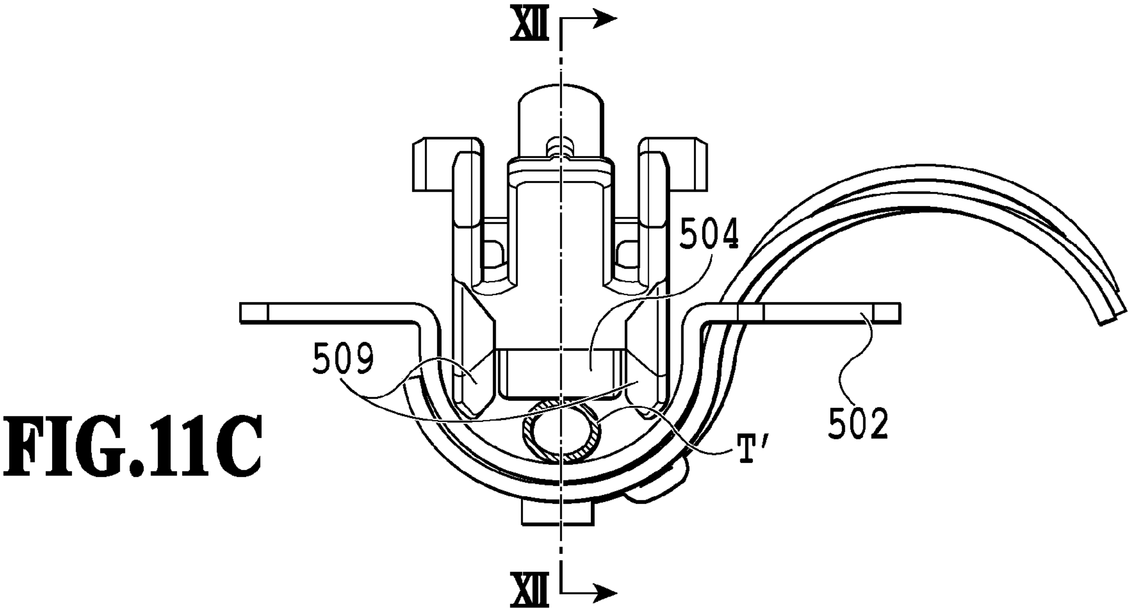

FIG. 11A through FIG. 11C indicate a more preferred embodiment in a case where the tube T needs to be conveyed in the reverse direction from that in which it is being printed. FIG. 11A through FIG. 11C are views of the present embodiment viewed from the same direction as in FIG. 6. In the printer 1 of the present embodiment, there is a predetermined distance from the print head 6 to the cutting part. Therefore, if a print job is completed and the next print job is started with the rear edge of the printed area of the tube T being cut, the leading edge of the tube T has a length corresponding to the distance from the print head 6 to the cutting part 30 at the leading edge of the tube T. Therefore, after cutting and before the start of the next printing job, the tube T is back-fed by a predetermined amount, that is, conveyed in the reverse direction from the conveyance direction during printing, to minimize the blank space created at the leading edge of the tube T.

However, in the printer 1 of the present embodiment, the tube heating unit 101 is positioned on the downstream side relative to the supply rollers 2*a* and 2*b* in the traveling direction of the tube T in a case where the tube T is fed back. Therefore, the frictional force generated by the pressing member 504 pressing the tube T against the metal member 502 acts as a resistance in a case where the tube T is fed back, which makes the tube T easily buckled.

In the printer 1 of the present embodiment, the inner diameter of printable tubes T is set to Φ1.5 mm to Φ10 mm. Generally, among these tubes, those with an inner diameter smaller than Φ3.0 mm are often made with a wall thickness of 0.4 mm, and those with an inner diameter equal to or larger than Φ3.0 mm are often made with a wall thickness of 0.5 mm. Therefore, in the following explanation, for convenience, tubes with an inner diameter smaller than Φ3.0 mm are referred to as small diameter tubes, and tubes with an inner diameter equal to or larger than Φ3.0 mm are referred to as large diameter tubes.

Small diameter tubes are easily buckled because of the thin wall thickness thereof and low rigidity in the bending direction. However, compared to large diameter tubes, small diameter tubes are easily warmed even at a lower temperature and can be easily deformed into a flat shape. Therefore, it is possible to apply heat, which is required for performing normal printing, to the tube without actively pressing the small diameter tube against the metal member 502.

On the other hand, large diameter tubes have a large heat capacity because of a large wall thickness. Therefore, it is necessary to actively press the tube against the metal member in order to apply the heat required for performing normal printing to a large diameter tube. Otherwise, large diameter tubes are not easily buckled because of the thick wall thickness thereof and low rigidity in the bending direction.

Therefore, as illustrated in FIG. 11A, an abutting portion 509 for regulating the space between the pressing member 504 and the metal member 502 is provided as a part of the holding member 505. The holding member 505 is biased toward the metal member 502 by the elastic member 506, but, in a case where the abutting portion 509 and the metal member 502 abut on each other, the holding member 505 does not move toward the metal member 502 any further. Therefore, when the tube is not set in the tube heating unit 101, a predetermined space is maintained between the pressing member 504 and the metal member 502. At this time, the maximum distance in the vertical direction between the pressure member 504 and the surface of the metal member 502 that contacts the tube is the distance between the lowest point of the surface of the metal member 502 that contacts the tube and the lowest point of the pressure member 504 that is directly above it. And the distance between these two points is set to be longer than the dimeter of the small diameter tube T". Therefore, when the small diameter tube T" is conveyed with the metal member 502 in the entire conveyance direction, the small diameter tube T" can pass through without contacting these two points at the same time. Then the space between the pressing member 504 and the metal member 502 is set so that a small diameter tube T" can pass through the space, it is possible to prevent the small diameter tube T" from being buckled in a case where the small diameter tube T" is fed back in a state of being set in the tube heating unit 101, it is possible to suppress friction generated between the pressing member 504 and small diameter tube T".

Therefore, since the small diameter tube T" passes between the pressure member 504 and the metal member 502, the space between the small diameter tube T" and the metal member 504 does not increase significantly, and the small diameter tube T" can be heated efficiently.

On the other hand, in a case where a large diameter tube is set in the tube heating unit 101 as illustrated in FIG. 11B, the pressing member 504 and the tube T abut on each other before the abutting portion 509 of the holding member 505 and the metal member 502 abut on each other. Therefore, the abutting portion 509 does not function and, thus, does not interfere with the pressing of the tube T against the metal member.

Even if friction occurs between the pressure member 504 or the metal member 504 and the tube T, the large diameter tube has high rigidity in the bending direction, so buckling does not occur.

In this embodiment, when the maximum diameter tube that can be set in the printer 1 is in the entire area of the conveyance direction of the metal member 502, the printer 1 can convey the tube with the largest diameter in contact with the metal member 502 and the pressure member 504. Further, when the tube is not set in the printer 1, the space between the pressing member 504 and the metal member 502 is maintained at a predetermined space. Then, the predetermined space is such that when the smallest diameter tube that can be set in the printer 1 is in the entire area of the conveyance direction of the metal member 502, the printer 1 can convey the smallest diameter tube in contact with the metal member 502 and not in contact with the pressure member 504. That is, in a state where the abutting portion 509 and the metal member 502 are abutting on each other, if the maximum distance between the pressing member 504 and the metal member 502 is longer than the minimum value and shorter than the maximum value of the outer diameter of the tube T that can be set to the tube heating unit 101, it is possible to avoid buckling of small diameter tubes from occurring and to efficiently apply heat to large diameter tubes.

Further, as illustrated in FIG. 11C, depending on the outer diameter of the tube T', there is a case in which the pressing member 504 and the tube T' abut on each other in a state where the abutting portion 509 and the metal member 502 abut on each other as well. In order for the pressing member 504 to press the tube T' even in such a case, it is preferable to set the pressing load with the elastic member 506 so that the abutting portion 509 and the metal member 502 make contact with each other with a predetermined abutting pressure.

Figure 12:
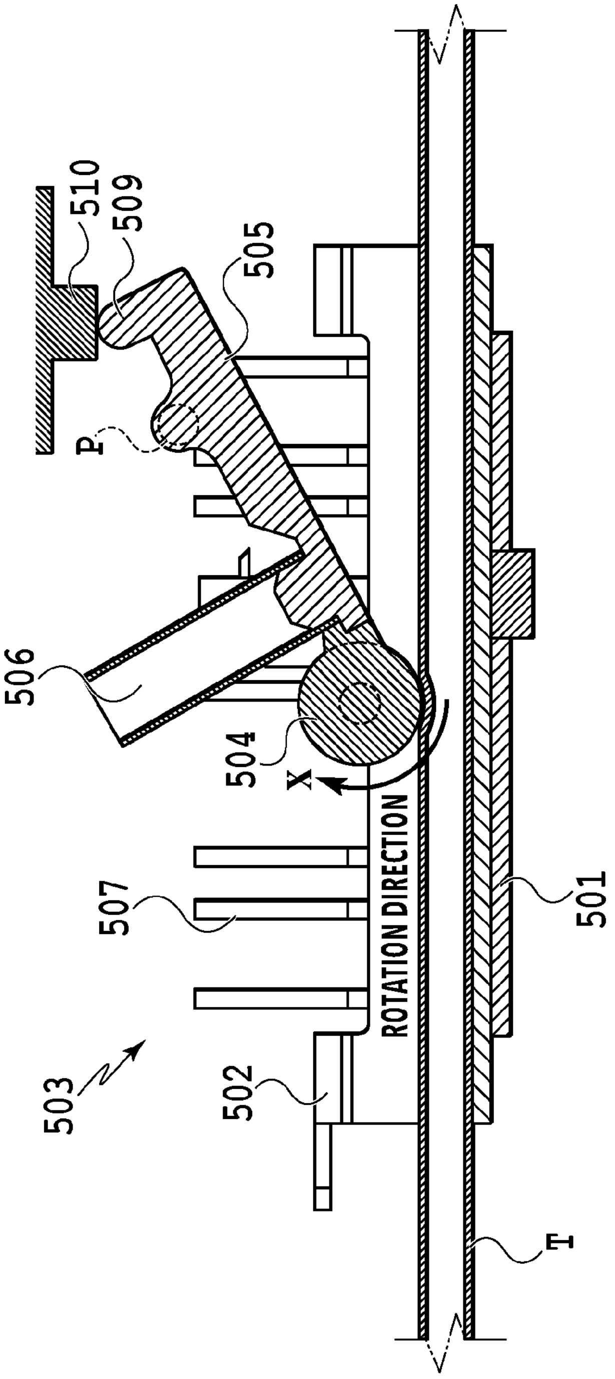
FIG. 12 is a cut-out view cut along the cross section of XII-XII of the heater unit illustrated in FIG. 11C.

Further, the abutting portion 509 is not limited to be at the position illustrated in FIG. 11A through FIG. 11C and can be provided so as to abut on a part other than the metal member 502 as illustrated in FIG. 12. In FIG. 12, the abutting portion 509 is provided on the other side of the rotational center P, and an abutted part 510 is arranged so that the abutting portion 509 makes contact with the abutted part 510 in a case where the abutting portion 509 moves upward. With such a configuration, even in a case where a small diameter tube is set, it is possible to maintain a predetermined space between the pressing member 504, which is biased by the elastic member 506, and the metal member 502. Note that, since a predetermined space is maintained between the pressing member 504, which is biased by the elastic member 506, and the metal member 502, it is also possible to adjust the natural length of the spring that is used as the elastic member 506 because a predetermined space is maintained between the pressing member 504, which is biased by the elastic member 506, and the metal member 502.

As explained above, according to an embodiment of the present invention, it is possible to provide a printing apparatus that is capable of efficiently applying heat to a tube-shaped print medium.

Other Embodiments

In the above-described embodiment, three arm parts 18*a* are adopted as the biasing part of the driving force transmitting member 18 acting on the fixed shaft member 11*s*. However, the biasing part in the present embodiment may be any type as long as the biasing part is capable of applying predetermined bias force to the fixed shaft part, and, for example, it is also possible that an arm part made of a metal leaf spring is disposed separately from the driving force transmitting member or formed integrally with the driving force transmitting member by insert molding. Further, it is also possible that the number of arm parts is two, and, in this case, it is preferable that the respective arm parts are arranged symmetrically with respect to the center of the rotation axis. Further, in the case where there are three arm parts, it is preferable that the respective arm parts are evenly arranged in the circumferential direction of the rotation axis. However, the present invention is not limited as such, and it is only needed, for example, that the rotation center is arranged to be inside the triangle connecting the pressure-applying parts 18*p* of the three arm parts when the driving force transmitting member is viewed in the rotation axis direction. Further, although the rotation center line of the one-way clutch 16 is arranged so as to extend in the vertical direction in the above implementation example, it is also possible that the rotation center line is arranged so as to extend in the horizontal direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-023383, filed Feb. 14, 2020, and No. 2021-018429, filed Feb. 8, 2021, which are hereby incorporated by reference herein in their entirety.

What is claimed is:

1. A printing apparatus comprising:

a conveyance unit configured to convey a tube-shaped print medium;

a print head configured to perform printing on the tube-shaped print medium that is conveyed by the conveyance unit in a conveyance direction;

a heater unit arranged on an upstream side relative to the print head with respect to the conveyance direction and configured to include a metal member and a heat generation body for heating the metal member, the metal member including an inner surface of a partially cylindrical shape in a circumferential direction; and a pressing unit configured to press the tube-shaped print medium toward the partially cylindrical shaped inner surface of the metal member, the tube-shaped print medium being brought into contact with the metal member by being pressed by the pressing unit, wherein the tube-shaped print medium is capable of passing through between the inner surface of the metal member and the pressing unit.

2. The printing apparatus according to claim 1, wherein the pressing unit includes a pressing member configured to make contact with the tube-shaped print medium so as to press the tube-shaped print medium.

3. The printing apparatus according to claim 2, wherein the conveyance unit is capable of conveying the tube-shaped print medium of the largest diameter with the tube-shaped print medium being in contact with the metal member and the pressure member when the tube-shaped print medium of the largest diameter that can be set in the printing apparatus is in an entire area of the metal member in the conveyance direction, wherein a space between the pressing member and the metal member is maintained at a predetermined space when the tube-shaped print medium is not set in the heating unit, and wherein the predetermined space is such that the conveyance unit can convey the tube-shaped print medium with the smallest diameter in contact with the metal member and not in contact with the pressure member, when the tube-shaped print medium with the smallest diameter that can be set in the printing apparatus is in the entire area of the metal member in the conveyance direction.

4. The printing apparatus according to claim 2, wherein the pressing unit includes:

a holding member configured to hold the pressing member, and biasing means configured to bias the holding member toward the metal member.

5. The printing apparatus according to claim 4, wherein the holding member includes an abutting portion, and when the tube-shaped print medium is not set in the heating unit, a predetermined space is maintained by abutting the abutting portion with the metal member.

6. The printing apparatus according to claim 4, wherein the pressing unit includes an elastic member as the biasing means.

7. The printing apparatus according to claim 2, wherein the pressing unit includes a rotatable roller as the pressing member.

8. The printing apparatus according to claim 1, wherein a direction in which the pressing unit presses the tube-shaped print medium is a direction that is approximately orthogonal to a direction in which the print head abuts on the tube-shaped print medium.

9. The printing apparatus according to claim 1, further comprising:

temperature detection means configured to detect a temperature of outside air; and control means configured to control a heat application operation of the heater unit, wherein the control means changes a heating temperature in the heat application operation according to the temperature detected by the temperature detection means.

10. A printing apparatus comprising:

a conveyance unit configured to convey a tube-shaped print medium along a predetermined conveyance path;

a heater unit provided with a metal member configured to extend along the predetermined conveyance path and a heat generation body configured to heat the metal member, the heat generation body being mounted on the metal member;

a pressing unit including a pressing member configured to press the tube-shaped print medium; and a print head configured to perform printing on the tube-shaped print medium being heated by the heater unit and conveyed by the conveyance unit, wherein the pressing member is arranged so that when the tube-shaped print medium is heated, the pressing member and the heat generation body pinch the metal member and the tube-sharped print medium, and wherein the pressing member is further configured so as to be movable in the direction of pinching the metal member.

11. The printing apparatus according to claim 10, wherein the pressing unit includes a rotatable roller as the pressing member.

12. A tube heating apparatus that is attachable to a printing apparatus including a conveyance unit configured to convey a tube-shaped print medium and a print head configured to perform printing on the tube-shaped print medium, in a state in which the tube heating apparatus is attached to the print apparatus, the tube heating apparatus being located on an upstream side relative to the print head with respect to the conveyance direction, the tube heating apparatus comprising:

a heater unit configured to include a metal member and a heat generation body for heating the metal member, the metal member including an inner surface of a partially cylindrical shape in a circumferential direction; and a pressing unit configured to press the tube-shaped print medium, which is conveyed by the conveyance unit of the printing apparatus, toward the partially cylindrical shaped inner surface of the metal member, the tube-shaped print medium being brought into contact with the metal member by being pressed by the pressing unit, wherein the tube-shaped print medium is capable of passing through between the surface and the pressing unit.

13. A printing apparatus comprising:

a conveyance unit configured to convey a first tube having a first outer diameter and a second tube having a second outer diameter larger than the first outer diameter along a predetermined conveyance path;

a heater unit provided with a metal member configured to extend along the predetermined conveyance path and a heat generation body configured to heat the metal member, the heat generation body being mounted on the metal member;

a pressing unit including a pressing member configured to press the first tube and the second tube; and a print head configured to perform printing on the first tube and the second tube heated by the heater unit and conveyed by the conveyance unit, wherein, when heating the first tube, the pressing member and the heat generation body are capable of pinching the metal member and the first tube, and wherein, when heating the second tube, the pressing member and the heat generation body are capable of pinching the metal member and the second tube.

* * * * *